United States Patent [19]

Snyder

[11] 4,206,389
[45] Jun. 3, 1980

[54] AUTOMATIC FIELD CONTROL FOR DIRECT CURRENT SHUNT MOTOR

[75] Inventor: James H. Snyder, Acton, Mass.

[73] Assignee: Clark Equipment Company, Buchanan, Mich.

[21] Appl. No.: 765,134

[22] Filed: Feb. 2, 1977

[51] Int. Cl.² .......................... H02P 5/00; H02P 7/00
[52] U.S. Cl. .................................. 318/317; 318/331; 318/332; 318/341; 318/357; 318/432
[58] Field of Search ............... 318/139, 331, 332, 341, 318/350, 356, 357, 358, 368, 373, 376, 379, 380, 381, 432, 317

[56] References Cited

U.S. PATENT DOCUMENTS

| | | | |
|---|---|---|---|
| 3,373,331 | 3/1968 | Dow | 318/317 |
| 3,518,518 | 6/1970 | Ford, Jr. et al. | 318/332 |
| 3,569,809 | 3/1971 | Comer | 318/350 |
| 3,599,064 | 8/1971 | Friedman | 318/338 |
| 3,845,368 | 10/1974 | Elco | 318/139 |
| 3,855,512 | 12/1974 | Konrad | 318/139 |
| 3,944,898 | 3/1976 | Wright | 318/376 |
| 3,962,612 | 6/1976 | Kawasaki | 318/139 |
| 4,019,107 | 4/1977 | Dixon et al. | 318/332 |

OTHER PUBLICATIONS

Millman et al., "Pulse, Digital and Switching Waveforms," 1965, pp. 389-394.

Primary Examiner—J. V. Truhe
Assistant Examiner—Eugene S. Indyk
Attorney, Agent, or Firm—Reising, Ethington, Barnard, Perry & Brooks

[57] ABSTRACT

A variable speed direct current shunt motor control system is disclosed for regulating the strength of the field to achieve and maintain a desired motor speed. The control system comprises a comparator circuit operable to compare a control voltage that is dependent on the armature voltage with a reference voltage that varies with torque demand. When the control voltage differs from the reference voltage, the comparator circuit develops a field demand or command signal that provides for the strengthening of the field to return the motor to the desired speed. A sensing circuit is incorporated into the control system to sense motor plugging and provide for field weakening.

9 Claims, 1 Drawing Figure

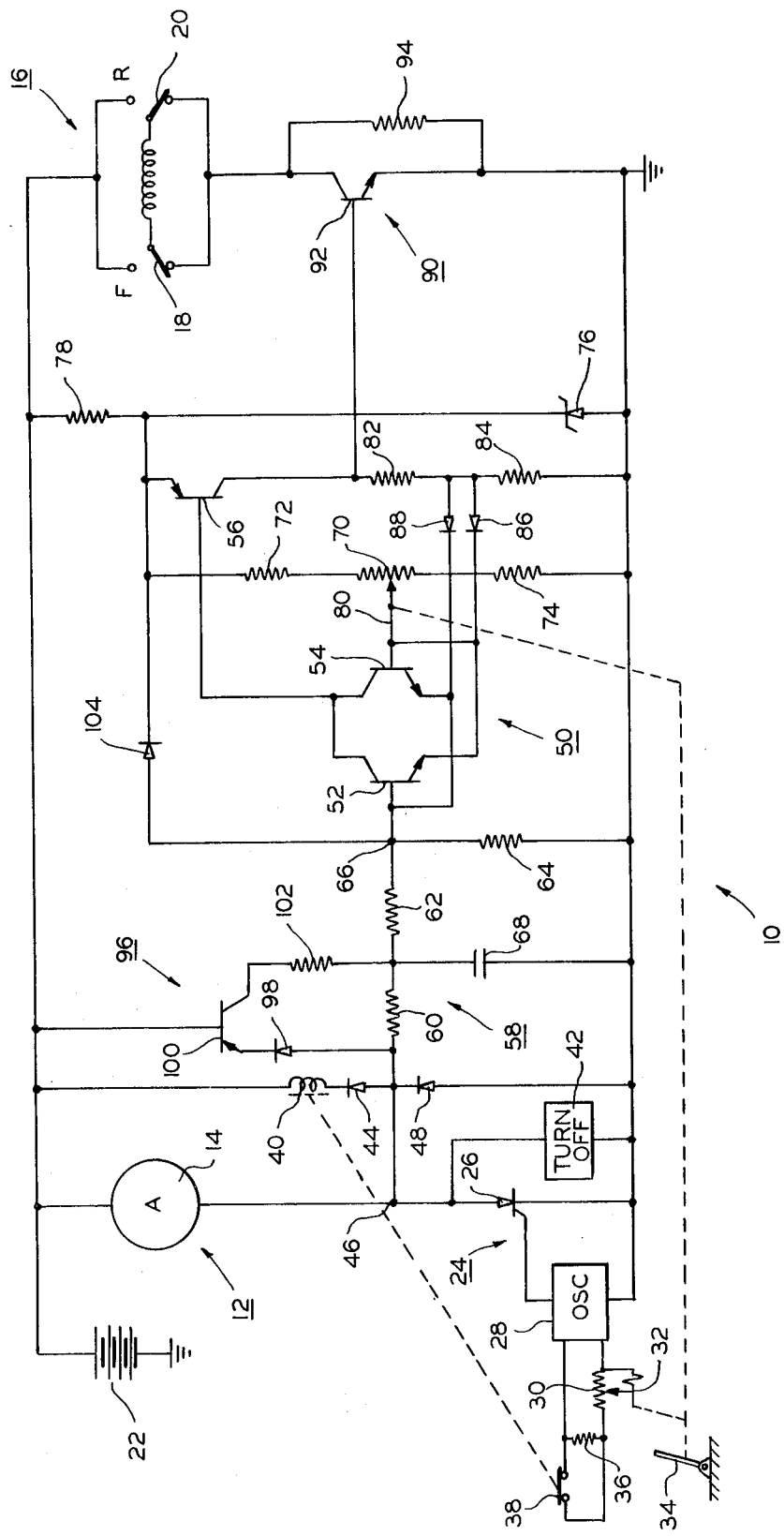

AUTOMATIC FIELD CONTROL FOR DIRECT CURRENT SHUNT MOTOR

BACKGROUND OF THE INVENTION

The present invention relates generally to control systems for direct current motors, and more particularly, to a system for automatically controlling the field of a direct current shunt motor to control motor speed.

Direct current shunt motors are successfully used in such material handling devices as forklift trucks. It is desirable from a standpoint of efficiency and safety to provide a motor with an automatic field control which enables the motor to quickly reach the desired speed as determined by the operator and maintain that speed under varying load conditions, such as when the vehicle travels up and down inclines.

Automatic control systems for shunt motors have been developed which control field current in response to motor operating conditions. In U.S. Pat. No. 3,378,746, issued Apr. 16, 1968, a system is disclosed in which the field current is regulated in accordance with armature current. In U.S. Pat. No. 3,569,809, issued Mar. 9, 1971, the field current is controlled in accordance with the difference of armature voltage and a motor speed voltage.

SUMMARY OF THE INVENTION

According to the present invention, the desired operation is achieved by controlling the shunt field current in accordance with torque demand and armature voltage. When acceleration is desired, as indicated by high torque demand and relatively low armature voltage, the field is strengthened to increase the driving torque. When deceleration is called for by a low torque demand and relatively high armature voltage, the field is strengthened and regenerative braking is produced. This is accomplished by a control system which includes a comparator circuit operable to compare a control voltage that varies with armature voltage and a reference voltage that varies with torque demand. No field current change is required if the control voltage approximates the reference voltage indicating the motor is operating at the desired speed. If the difference between these voltages is greater than a predetermined voltage magnitude, the speed of the motor has deviated from the desired speed and a change in field current is required. In response to the sensed voltage differences, the detector circuit produces a command signal proportional to the absolute value of the difference between the control and reference voltages to increase field current an amount commensurate with the field demand signal. Accordingly, the comparator circuit produces a field demand signal to increase the field strength to accelerate or decelerate the motor to the desired speed.

A sensing circuit may be incorporated into the control system and coacts with the comparator circuit to provide a weak field and reduce the braking caused by the plugging operation. Also, the input voltage to the armature may be reduced to further reduce the braking.

It is therefore an object of the present invention to provide an automatic control system which maintains the motor speed at the desired speed.

It is another object of the invention to provide a control system which senses motor plugging and weakens the field in response to such sensing.

DETAILED DESCRIPTION OF THE INVENTION

Further objects, features and advantages of the present invention will become apparent from a consideration of the following description and the accompanying drawing in which:

The single FIGURE is a schematic drawing of the automatic control system incorporated into a direct current shunt motor.

Referring to the drawing, the automatic control system of the present invention, indicated generally at 10, functions to regulate the field of a direct current shunt motor 12 to maintain or change the speed of the motor to a desired value. The direct current shunt motor 12 is provided with an armature 14 and a shunt field winding circuit 16 connected in parallel with the armature 14. The shunt field circuit 16 has reversing switches 18 and 20 at its terminals to provide for reversal of motor rotation. A direct current power source comprising a battery 22 provides electrical energy to the armature 14 and the field circuit 16. The negative pole of the battery 22 is connected to ground.

An armature voltage controller, in the form of a chopper circuit 24, provides a variable input voltage to the armature 14 to control the speed of the motor 12. The chopper circuit 24 comprises a controlled rectifier 26 connected in series with the armature 14 to provide a time-average voltage to the armature 14 to control the motor speed. The controlled rectifier 26 is fired by an oscillator 28 at a pulse rate of the oscillator 28. The oscillator circuit includes a variable resistor 30 for adjusting the oscillator frequency. The wiper 32 of the variable resistor is connected by suitable means to a manual control device such as an accelerator pedal 34 positioned on a vehicle such as a forklift truck. The operator of the vehicle controls the motor speed by varying the output of the oscillator 24 through movement of the wiper 32 when the accelerator pedal 34 is depressed or released. The oscillator circuit also includes a fixed resistor 36 in series with the variable resistor 30. A shorting switch 38 is connected across the resistor 36 and is activated by a plugging relay 40, referred to below. The chopper circuit 24 is provided with a turn-off 42 which momentarily bypasses the rectifier 26 to terminate conduction in the rectifier 26 after it has been fired for a predetermined length of time. A free wheeling or fly-back diode 44 is connected across the armature 14 and provides a current path during the fly-back voltage with the controlled rectifier 26 turned off. The fly-back diode 44 has its anode connected to the junction 46 between the armature 14 and the controlled rectifier 26 and its cathode is connected to the other terminal of the armature 14 through the plugging relay 40. The voltage across the diode 44 during the off time of the controlled rectifier 26 varies with the amount of armature current in the motor 12. In the illustrated embodiment, this voltage varies between approximately 0.7 and 2 volts. The chopper circuit 24 has an output that varies between 40 and 200 pulses per second. When the chopper circuit 24 is operated in the low frequency ranges, the fly-back current flow through diode 44 may cease before the successive turn-on of the controlled rectifier 26.

A diode 48 having its anode connected to the negative pole of the battery 22 and its cathode connected to the armature 14 provides a path for current flow when the motor 12 operates as a generator during regenerative braking. When the counter EMF becomes greater than the applied voltage, power is directed back to the battery 22 thus reclaiming a portion of the energy required to drive the vehicle. The motor 12 generates energy when the speed of the vehicle is increased as a result of external forces such as when it descends a decline.

A comparator circuit, indicated generally at 50, functions to compare a control voltage with a reference voltage and in response to a difference between those voltages produces a field demand or command signal which controls the field strength to in turn control the speed of the motor 12. The control voltage is a function of the motor counter EMF, the armature current, and the duty cycle of the chopper circuit 24. The reference voltage has a magnitude corresponding to torque demand and is changed when the operator of the vehicle depresses the accelerator pedal 34.

The comparator circuit 50 includes transistors 52, 54 and 56. It is a comparator having one input at the base of transistor 52 and the other input at the base of transistor 54, and an output, which corresponds within limits to the voltage difference of the inputs, is derived from the emitter-collector circuit of transistor 56. The control voltage is developed by control voltage means 58 connected with the armature circuit across the voltage controller 24. The control voltage means 58 comprises a voltage divider network including resistors 60, 62 and 64 connected between the junction 46 and ground. The control voltage is derived across resistor 64 at junction 66 and a capacitor 68 is connected across resistors 62 and 64 to smooth the control voltage. The control voltage applied to the base of transistor 52 is a time-average value corresponding to the instantaneous voltage at the junction 46. The reference voltage is developed by a reference voltage means comprising a potentiometer 70 which has its terminals connected to a constant voltage source through the resistors 72 and 74. A constant voltage is provided across the Zener diode 76 which is connected through a resistor 78 across the battery 22. The reference voltage signal is obtained at the wiper contact 80 on the potentiometer 70 and is applied to the base of transistor 54. As shown in the drawing, the wiper contact 80 and the wiper contact 32 on the variable resistor 30 are coincidentally controlled by suitable means through actuation of the accelerator pedal 34.

Referring to the comparator circuit 50, the transistors 52, 54 and 56 function as an absolute value amplifier of the difference between the control voltage and the reference voltage at the bases of transistors 52 and 54, respectively. The output circuit of transistor 56 from emitter to collector is connected across the Zener diode 76 through resistors 82 and 84. The collectors of the transistors 52 and 54 are connected to the base of transistor 56. The emitter of transistor 52 is connected to the base of transistor 54 and to junction of resistors 82 and 84 through a diode 86. Similarly, the emitter of the transistor 54 is connected to the base of transistor 52 and to the junction between the resistors 82 and 84 through a diode 88. Diodes 86 and 88 provide a negative feedback to the transistors 52 and 54 to stabilize the amplifier.

Because of the biasing characteristics of the transistors 52 and 54, i.e. the base-to-emitter voltage requirements, base current will not flow in transistor 56 unless there is a predetermined difference between the reference and the control voltages, having a magnitude, for example, greater than 0.6 volt. When a difference greater than 0.6 volt occurs, the transistor having the lower voltage value will be cut off and the other transistor will be conductive and allow emitter to base current flow in transistor 56. Output current will flow through transistor 56 and produce an output across resistor 82 having a voltage of approximately twice the value of the base voltage of the conducting transistor. This output is the field demand or command signal and is applied to a field current controller 90 which will be described presently. The field current controller 90 comprises a transistor 92 and a shunt resistor 94 connected in series with the field winding 16. The transistor 92 has its collector connected to the field winding circuit 16 and its emitter connected to ground. The resistor 94 is connected across the collector and emitter of the transistor 92; when the transistor 92 is shut off, the current flow in the field is limited by the resistor 94 thereby limiting field strength to a minimum level. Thus, current flow through the transistor 92 strengthens the field and the degree of conductivity through transistor 92 regulates current flow above the minimum level.

A plug sensing circuit 96 comprising a diode 98, a transistor 100, and a resistor 102 is provided to control the output of transistor 56 when the motor is plugged; that is, when the motor is rotating in one direction and current flow through the field winding 16 is reversed as a result of reverse positioning of the switches 18 and 20. The sensing circuit 96 also affects the value of the control voltage applied to the base of transistor 52 when a high armature current exists as a result of full depression of the accelerator 34, for example. Diode 98 has its anode connected to the junction 46 and has its cathode connected to the emitter of transistor 100 which in turn has its base connected to the positive pole of the battery 22. Resistor 102 connects the collector of transistor 100 to the junction of resistors 60 and 62.

When current flow through diode 44 is of a sufficient magnitude so that the voltage drop across the diode 44 and relay 40 is raised to a predetermined value, for example, 1.4 volts, conduction through diode 98 will occur and transistor 100 will conduct. As a result, an increased control voltage is applied to the base of transistor 52. A diode 104 is connected between the base of transistor 52 and the emitter of the transistor 56. In normal operation, the diode 104 remains back-biased by the voltage across the Zener diode 76. When armature current is high, the sensing circuit 96 applies an increased control voltage to the base of transistor 52 to thereby increase the output of transistor 56 which in turn increases current flow through transistor 92 to increase the field strength. As a result, the motor 12 is accelerated to the desired speed. During plugging, however, the output of the sensing circuit 96 is great enough to forward bias diode 104 and cut off transistor 56 which terminates conduction in transistor 92 to provide minimum field strength.

Assume that the forklift is at a standstill. The operator depresses the accelerator 34 to a desired position to accelerate the forklift to a desired speed. When the accelerator 34 is depressed, the wiper 32 on the variable resistor 30 is moved to a position to increase the frequency output of the oscillator 28 thereby increasing the voltage applied to the armature 14. Simultaneously, the wiper 80 on the potentiometer 70 is moved to a position to lower the reference voltage applied to the base of transistor 54. Because the counter EMF of the motor 12 is at a minimum due to low motor speed, the control voltage applied to the base of transistor 52 will have a magnitude greater than the reference voltage applied to the base of transistor 54 and this magnitude will exceed the bias voltage required to operate the absolute amplifier in its linear amplification range. Transistor 54 will be shut off and collector current will flow in transistor 52 thus causing current flow through transistor 56. The output of transistor 56 is proportional to the absolute value of the difference between the control voltage and the reference voltage. Transistor 92 is conductive in accordance with the field demand signal and increases the current through the field winding circuit 16 thereby increasing the strength of the field. As a result of increased field strength, the motor torque is increased to accelerate the motor 12 to the desired speed. As the motor speed increases, the counter EMF also increases thus reducing the control voltage applied to the base of transistor 52. As the control voltage gradually decreases, the output of transistor 56 decreases thereby decreasing conduction through transistor 92 and weakening the field. When the motor 12 has achieved a speed in accord with the load and the torque demand set by the operator, the control voltage at the base of transistor 52 will stabilize at a given value and a steady state conduction through transistor 56 will maintain the field at the desired strength.

Assume that the forklift truck is operating at the desired speed and it begins to travel down a decline. In this operating mode, the kinetic energy of the vehicle tends to increase the motor speed above the desired level so that the motor is driven as a generator and the counter EMF increases above the supply voltage. The motor is now in a regenerative braking mode with current flowing through diode 48 through the armature 14 and back to the battery 22. The increased counter EMF further drives down the control voltage at the base of transistor 52 below the reference voltage at the base of transistor 54. Transistor 52 is thus cut off and collector current flows through transistor 54 and transistor 56 becomes conductive and increases the field demand signal at transistor 92 which increases the current in the field circuit 16. As a result, there is an increase in the torque which opposes the rotation of the armature. As the vehicle decelerates to the desired speed, the control voltage at the base of transistor 52 gradually increases toward the voltage at the base of transistor 54 until a state of equilibrium is reached.

The operator commonly initiates reverse energization of the motor 12 before it is brought to a standstill. This is plugging of the motor and is produced by reversing the switches 18 and 20 in the field winding 16 to reverse current flow therethrough. It is important that a smooth, continuous deceleration occur to avoid operator injury and equipment damage. For this purpose, the sensing circuit 96 functions to weaken the field so that the deceleration is reduced. When the field is reversed, the counter EMF in the armature 14 is reversed thereby increasing voltage across the armature 14 and the current through diode 44. The voltage drop across the diode 44 and the relay 40 is increased sufficiently so that current flows in diode 98 allowing current flow in transistor 100 to develop an increased control voltage applied to the base of transistor 52. This voltage is sufficient to forward bias diode 104 and transistor 56 is turned off. Transistor 92 is consequently turned off and current flow through the field 16 is limited by the resistor 94. Consequently, minimum field strength is produced to enable a continuous smooth slow-down of the motor 12. The relay 40 is connected in series with the diode 44 and is activated in response to a value of current through diode 44 which indicates that the motor 12 is being plugged. The relay 40 is connected to the normally closed switch 38 which shorts the resistor 36 that is connected in series with the variable resistor 30. When the relay 40 is activated, the switch 38 is opened causing the frequency of the oscillator 28 to decrease and thereby reduce the voltage applied to the armature 14. Thus, both the field and the armature 14 have reduced current flow to decrease the deceleration during plugging. As the motor speed decreases, the current through the diode 44 decreases. Transistor 56 will remain turned off until diode 104 becomes reversed biased.

A preferred embodiment of the invention has been disclosed. The invention, however, is not to be limited to the specific structure shown, but rather is to be limited only by the following claims.

What is claimed is:

1. In a motor control system of the type comprising a DC shunt motor having an armature winding and a shunt connected field winding, an armature voltage controller connected in series with the armature winding across a DC voltage source and having adjustable torque demand means connected with the voltage controller to change the voltage applied across the armature, the improvement comprising reference voltage means connected with the torque demand means for producing a reference voltage which represents torque demand, control voltage means connected across the armature voltage controller for producing a control voltage directly related to armature voltage, comparator means connected with the reference voltage means and the control voltage means for producing a field demand signal corresponding with the difference between the reference and control voltages, and field current control means connected with the comparator means and with said field winding for increasing the field current in correspondence with the field demand signal whereby the control voltage is changed toward equalization with the reference voltage.

2. The control system according to claim 1 wherein said comparator means is operable to produce a field demand signal corresponding with the absolute value of the difference between the control voltage and the reference voltage.

3. The control system according to claim 2 wherein said comparator means comprises first and second transistors each having an input circuit and an output circuit, the input circuit of the first transistor receiving the algebraic difference of the control voltage and the reference voltage, and the input circuit of the second transistor receiving the algebraic difference of the reference voltage and the control voltage, the output circuits of the first and second transistors having a common output means whereby the output means develops said field demand signal.

4. The control system according to claim 3 wherein said common output means incudes a third transistor having an input coupled with the output circuits of the first aand second transistors and having an output circuit coupled with said field current control means.

5. The control system according to claim 2 wherein said armature voltage controller includes a controlled rectifier in series with the armature winding and switching means connected with the torque demand means for switching the controlled rectifier on and off at an adjustable frequency and wherein said control voltage means includes means for deriving a control voltage having a value which corresponds to the time average value of the voltage across the controlled rectifier.

6. The control system according to claim 5 including a rectifier connected in series with said armature winding and in parallel and opposite polarity with said controlled rectifier whereby reverse armature current may flow during regenerative braking.

7. The control system according to claim 1 further including motor plugging sensing means coupled with said armature and said field current control means and being responsive to a reverse armature voltage in excess of a predetermined value for decreasing the field current.

8. The control system according to claim 7 wherein said sensing means is connected to the control voltage means and is operable to increase said control voltage above a predetermined value, said comparator means including means for decreasing said field demand signal when the control voltage exceeds said predetermined value.

9. In a motor control system of the type comprising a DC shunt motor having an armature winding and a shunt connected field winding, an armature voltage controller connected in series with the armature winding across a DC voltage source and having adjustable torque demand means connected with the voltage controller to change the voltage applied across the armature, the improvement comprising adjustable reference voltage means connected with the torque demand means and being adjustable concurrently therewith, control voltage means connected across the armature voltage controller and adapted to develop a control voltage related to the difference between the voltage of the source and the armature voltage, voltage comparator means having a first input connected with the reference voltage means and a second input connected with said control voltage means, said comparator means being adapted to produce an output signal corresponding to the difference between the control and reference voltages, a field current controller connected in series with the field winding across the voltage source, the output of said comparator means being connected with said field current controller to increase the field current in correspondence with increases of said output signal.

* * * * *